UNITED STATES PATENT OFFICE.

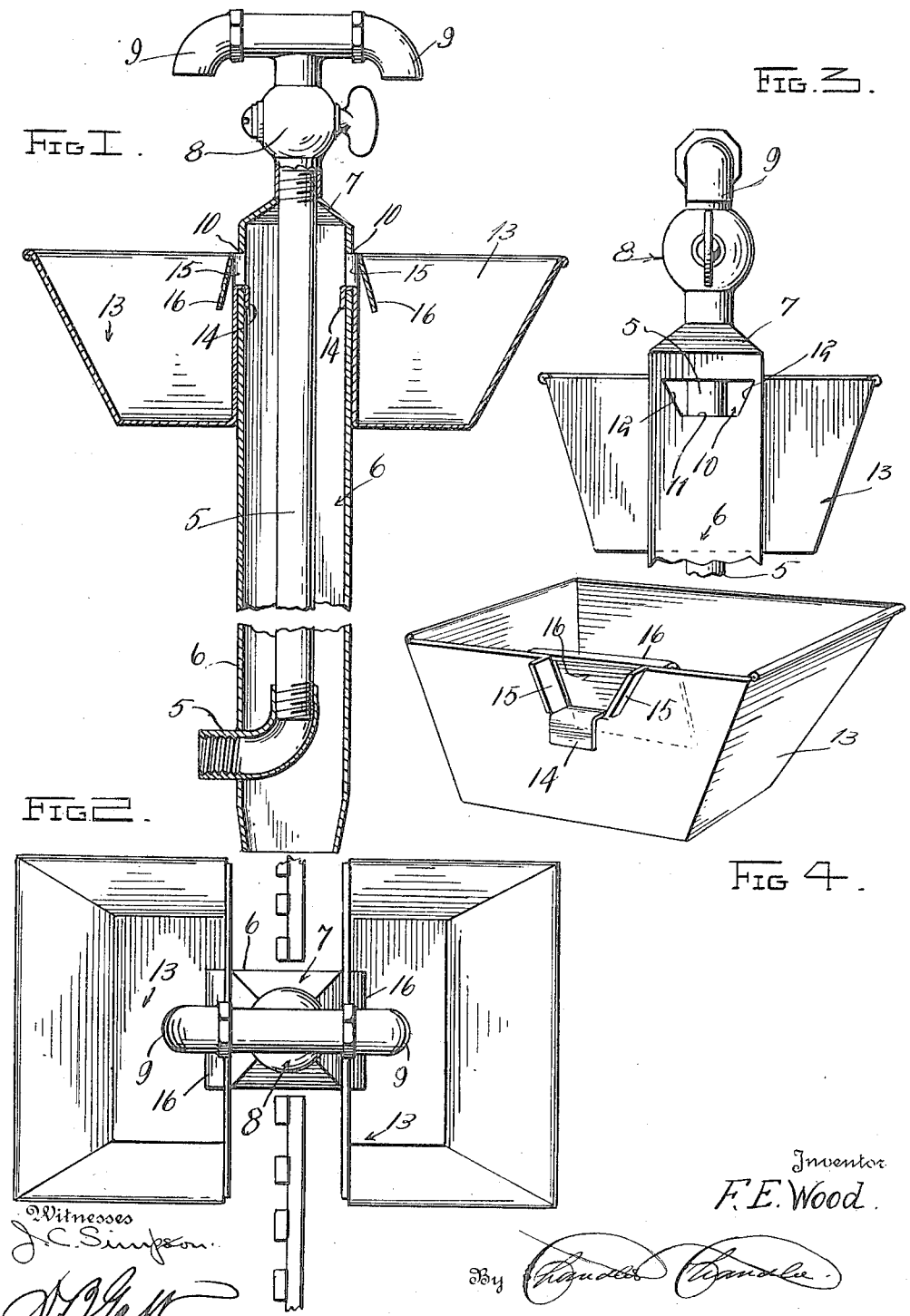
F. E. WOOD
STOCK WATERING FOUNTAIN.
APPLICATION FILED MAR. 14, 1916.
1,206,281. Patented Nov. 28, 1916.
Inventor
F. E. Wood.

FREDERICK E. WOOD, OF FLUSHING, NEW YORK.

STOCK-WATERING FOUNTAIN.

1,206,281.

Specification of Letters Patent.   Patented Nov. 28, 1916.

Application filed March 14, 1916.   Serial No. 84,159.

*To all whom it may concern:*

Be it known that I, FREDERICK E. WOOD, a citizen of the United States, residing at Flushing, in the county of Queens, State of New York, have invented certain new and useful Improvements in Stock-Watering Fountains; and I do hereby declare the following to be a full, clear, and exact description of the invention, such as will enable others skilled in the art to which it appertains to make and use the same.

This invention relates to stock watering fountains, and aims primarily to provide means whereby the duct or pipe for delivering water to the trough will be prevented from freezing.

A further object of the invention is to provide means whereby water may be directed to continually flow into and out of the water trough, thereby maintaining pure fresh water in the drinking trough at all times.

A still further object of the invention is to provide in a device of the class described, improved means whereby the trough may be detached from its support to facilitate cleaning of the same, and further characterized by means for preventing dirt or trash being conveyed from the trough to the outlet or drain pipe.

A still further object of the invention is to provide means whereby a plurality of troughs may be fed from a single source of fluid supply.

With these objects in view together with others which will appear as the description proceeds, the invention resides in the novel combination and arrangement of parts all as will be described more fully hereinafter, illustrated in the drawings and particularly pointed out in the claims.

The invention will be best understood by reference to the accompanying drawings, wherein:

Figure 1, is a vertical sectional view taken through a watering fountain constructed in accordance with the invention, Fig. 2, is a top plan view of the device, Fig. 3, is a side view of the fountain with one of the troughs removed, and Fig. 4, is a detail perspective view of one of the improved watering troughs.

Referring now more particularly to the drawings, 5 indicates a feed pipe, which may be connected to communicate with any suitable source of fluid supply. This feed pipe may be arranged to project above the ground at any suitable place, and is surrounded by a casing 6, of substantially greater diameter than the said pipe, whereby a chamber is formed within said casing and surrounding the feed pipe 5. The upper end of the chamber may be closed as shown at 7, while the lower end of the same may be connected to communicate with a suitable sewer or drain system. The end of the feed pipe 5 protruding from the outer extremity of the casing 6 is equipped with a suitable valve 8, from which oppositely disposed outlets 9 are projected.

The casing 6 is provided at any suitable distance above the ground with a pair of oppositely disposed openings 10, the said openings being preferably arranged in alinement with the nozzles 9 at the extreme end of the pipe 5. Each of the openings are preferably so formed as to provide a horizontally disposed lower edge 11 and outwardly and upwardly inclined side edges 12.

The troughs employed in carrying out the invention comprise vessels 13, having restricted bottoms and being arranged to provide a substantially large open end. In the rear wall of each of the troughs 13 is provided an aperture of substantially the same contour and size as the openings 10 in the casing 6, a lip 14 being arranged to be coextensive with the lowermost wall of the opening 10 and projecting outwardly and downwardly therefrom. Upwardly projecting flanges 15 may be arranged to extend coextensive with the upwardly and outwardly inclined edges of the opening of each trough, and it is apparent that when the lip 14 is engaged over the lowermost edge of the opening in the casing 6, the flanges 15 carried by the said trough will project into the interior of the said casing. The arrangement permits of the trough being readily attached to and detached from the casing 6, and to permit of water flowing from the trough into the chamber within the casing 6 without danger of leakage at the point of connection of the trough with the casing. The opening in the trough 13 is preferably formed adjacent the upper edge thereof, whereby a relatively high water level will be maintained within the trough.

To prevent leaves, trash or other matter which might fall into the trough from gaining access to the interior of the casing 6, an apron or guard 16 is arranged upon the trough to project downwardly from the upper edge of the opening thereof beyond the lowermost edge of said opening, and spaced inwardly of the trough from the rear wall thereof. It is apparent that the apron or guard thus arranged will prevent access of the floating matter within the trough to the casing 6.

It is apparent that when a trough constructed in accordance with the above description is arranged with its lip 14 engaged within the opening 10 upon each side of the casing 6, water or other fluid from the nozzles or outlets 9 will be collected and retained by the said troughs, and continued flow of water will be cared for by the openings arranged adjacent the upper edges of the said troughs. As the water flows from each of the troughs into the chamber 6 it is obvious that it will be carried off by the drain with which the casing is connected, and by providing a continuous flow of water, danger of freezing will be overcome. It is also to be observed that an adequate outlet thus provided will prevent overflowing of the troughs. The guards or aprons 16 will prevent stoppage at the outlet openings.

When desired, the troughs may be easily and quickly detached from the casing to be cleaned or replaced.

It is also obvious that fountains of the above character may be arranged in various yards or pens, and each connected to obtain fluid from a common source of supply.

It is obvious also that the fountain may be positioned at the dividing fence or wall of a pen or other inclosure with the troughs projecting into the different pens, whereby stock in the separate inclosures may be watered from the one source of supply without danger of spreading contagious diseases from one to the other.

While I have herein shown and described a particular or preferred embodiment of my invention, I wish it to be understood that I need not confine myself to all the precise details of construction herein set forth by way of illustration, as modification and variation may be made without departing from the spirit of the invention or exceeding the scope of the claims.

I claim:

1. In a device of the class described, a supply pipe, a casing surrounding said pipe and spaced therefrom to provide a chamber, the casing being provided with an opening, a trough provided with an aperture adapted to register with the opening in said casing, a lip on said trough for engagement over the lower edge of said opening, and means for delivering fluid from said pipe to said trough, substantially as described.

2. In a device of the class described, a supply pipe, a casing surrounding said pipe and spaced therefrom to provide a chamber, the said casing being provided adjacent its upper portion with oppositely disposed openings, a trough provided with an aperture adapted to register with said opening arranged upon opposite sides of said casing, a lip on each of said troughs for engagement over the lower edge of each of said openings, flanges projecting outwardly from the edges of said aperture to protrude through said opening into said chamber, an apron secured to project within each of said troughs outwardly from the rear wall, and nozzles on said pipe for directing fluid into each of said troughs, substantially as described.

3. In a device of the class described, a casing having an opening therein, certain of the edges of the opening being parallel and the other edges inclining toward each other from one to the other of the parallel edges, a trough, a lip projecting rearwardly and downwardly from said trough and adapted to engage upon one of said parallel edges, angularly and rearwardly projecting flanges on said trough adapted to engage within said opening and to rest upon the inclined edges thereof, and means for directing fluid into said trough, substantially as described.

4. In a device of the class described, a casing, a pipe extending through and beyond said casing, a nozzle on said pipe, the said casing having an opening in the side thereof, the upper and lower edges of said opening being parallel and the side edges inclining downwardly toward each other, a trough, a lip projecting rearwardly and downwardly from said trough and adapted to rest upon the lowermost of said casing opening edges, the said trough having an opening for registration with the opening in said casing, rearwardly projecting inclined flanges on said trough adapted to enter the casing opening and to rest upon the inclined edges thereof, and an apron within said trough spaced from the rear wall thereof and extending below the trough opening, substantially as described.

In testimony whereof, I affix my signature, in the presence of two witnesses.

FREDERICK E. WOOD.

Witnesses:
Thos. F. Burns,
Sophia Lievendag.

Copies of this patent may be obtained for five cents each, by addressing the "Commissioner of Patents, Washington, D. C."